US012732540B1

(12) United States Patent
Andersson et al.

(10) Patent No.: US 12,732,540 B1
(45) Date of Patent: Sep. 8, 2026

(54) MUTUAL TRANSPORT LAYER SECURITY FOR SECURE SOCKETS LAYER FORWARD PROXY

(71) Applicant: Juniper Networks, Inc., Sunnyvale, CA (US)

(72) Inventors: Johan Rikard Martin Andersson, Hagersten (SE); Suresh Vishwanathan, Bangalore (IN); Dipta Pandit, Bengaluru (IN); Nikhil Gavraskar, Bangalore (IN); Mohan Thangavel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 42 days.

(21) Appl. No.: 18/733,027

(22) Filed: Jun. 4, 2024

(51) Int. Cl.
*H04L 9/40* (2022.01)

(52) U.S. Cl.
CPC ........ *H04L 63/166* (2013.01); *H04L 63/0823* (2013.01)

(58) Field of Classification Search
CPC . H04L 63/0236; H04L 63/0823; H04L 63/20; H04L 63/0245; H04L 45/74; H04L 63/02; H04L 63/166
See application file for complete search history.

(56) References Cited

U.S. PATENT DOCUMENTS 9,893,883 B1 2/2018 Chaubey et al.
10,949,526 B2 3/2021 Kermes et al.
2010/0322241 A1* 12/2010 Convery ............ H04L 61/5076 370/389
2016/0277446 A1* 9/2016 Kumar .................... H04L 45/74
2019/0007403 A1* 1/2019 Xu ...................... H04L 63/0876
2019/0230120 A1* 7/2019 Chen ....................... H04L 63/20
2020/0007445 A1* 1/2020 Anwer .................... H04L 41/40
2025/0039155 A1* 1/2025 Bansal ................ H04L 63/0823

* cited by examiner

*Primary Examiner* — Olugbenga O Idowu
(74) *Attorney, Agent, or Firm* — Harrity & Harrity, LLP

(57) ABSTRACT

In some implementations, a network device configured as a secure sockets layer forward proxy may receive network traffic associated with an identity. The network device may transmit, using mutual transport layer security, a request for a client certificate associated with the identity. The network device may receive, responsive to the request, the client certificate. The network device may receive, based on the client certificate, identity-specific authentication entry information. The network device may selectively transmit further network traffic based on the identity-specific authentication entry information. The network device may delete, based on the client certificate, a session associated with the identity.

20 Claims, 6 Drawing Sheets

300

MUTUAL TRANSPORT LAYER SECURITY FOR SECURE SOCKETS LAYER FORWARD PROXY

BACKGROUND

Network security devices, such as firewalls, can monitor and/or control the flow of network traffic. For example, a firewall can permit or deny network traffic based on one or more security policies.

SUMMARY

Some implementations described herein relate to a method. The method may include receiving, by a network device configured as a secure sockets layer (SSL) forward proxy (SSLFP), network traffic associated with an identity. The method may include transmitting, by the network device, using mutual transport layer security (MTLS), a request for a client certificate associated with the identity. The method may include receiving, by the network device, responsive to the request, the client certificate. The method may include deleting, by the network device, based on the client certificate, a session associated with the identity.

Some implementations described herein relate to a device configured as an SSLFP. The device may include one or more memories and one or more processors. The one or more processors may be to receive network traffic associated with an identity. The one or more processors may be to transmit, using MTLS, a request for a client certificate associated with the identity. The one or more processors may be to receive, responsive to the request, the client certificate. The one or more processors may be to receive, based on the client certificate, identity-specific authentication entry information. The one or more processors may be to selectively transmit further network traffic based on the identity-specific authentication entry information.

Some implementations described herein relate to a non-transitory computer-readable medium that stores a set of instructions. The set of instructions, when executed by one or more processors of a device configured as an SSLFP, may cause the SSL to receive network traffic associated with an identity. The set of instructions, when executed by one or more processors of the SSL, may cause the SSL to transmit, using MTLS, a request for a client certificate associated with the identity. The set of instructions, when executed by one or more processors of the SSL, may cause the SSL to receive, responsive to the request, the client certificate. The set of instructions, when executed by one or more processors of the SSL, may cause the SSL to receive, based on the client certificate, identity-specific authentication entry information. The set of instructions, when executed by one or more processors of the SSL, may cause the SSL to selectively transmit further network traffic based on the identity-specific authentication entry information. The set of instructions, when executed by one or more processors of the SSL, may cause the SSL to delete, based on the client certificate, a session associated with the identity.

DETAILED DESCRIPTION

Figure 1:
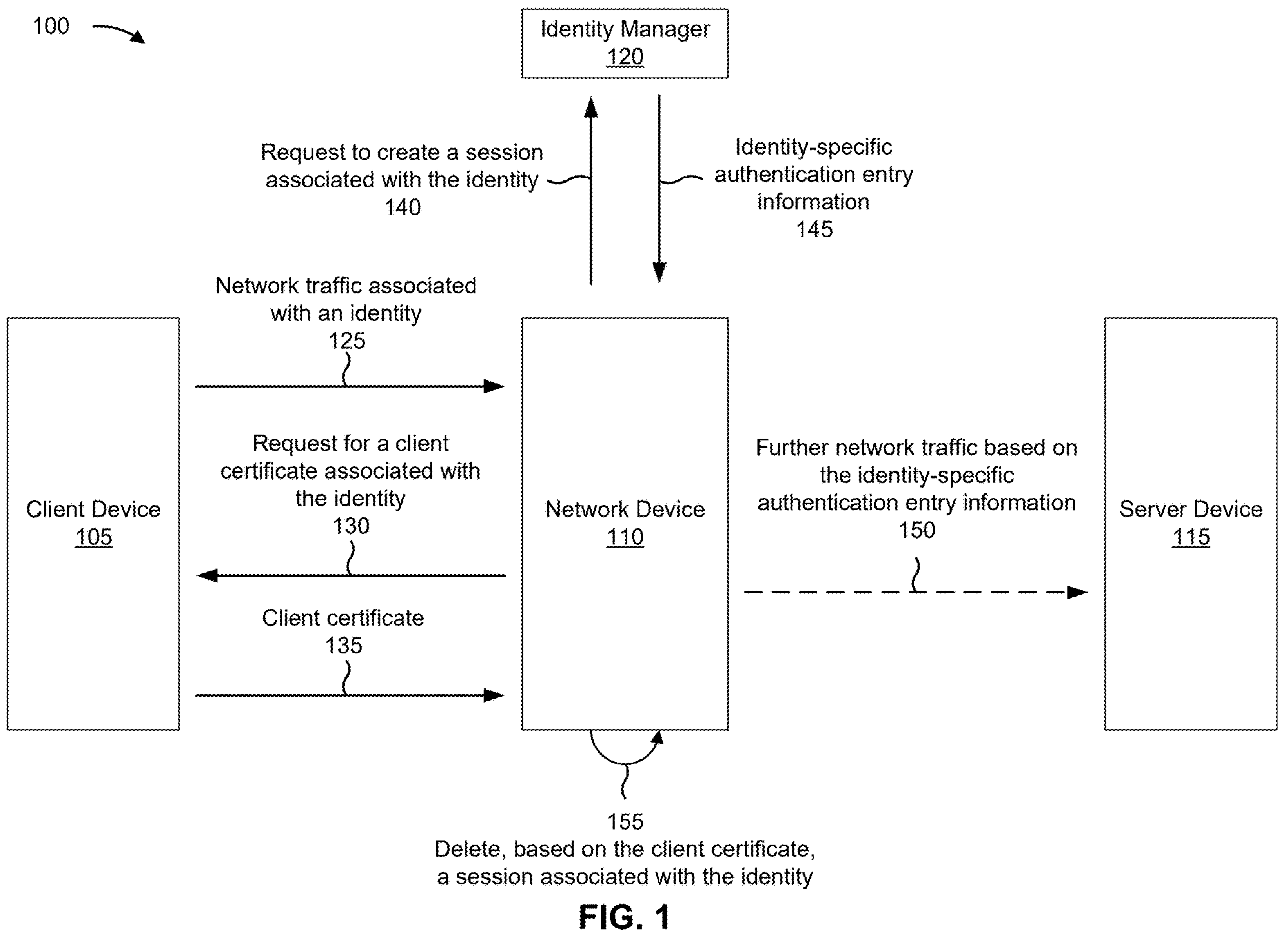
FIG. 1 is a diagram of an example implementation associated with MTLS for an SSLFP.

The following detailed description of example implementations refers to the accompanying drawings. The same reference numbers in different drawings may identify the same or similar elements.

Network traffic may be associated with a user account or a service account. A user account may be dedicated for a user (e.g., a human user), and a service account may be dedicated for a service (e.g., a service provided by a structured query language (SQL) server, a hypertext transfer protocol (HTTP) server, or the like). In some cases, a client device having an internet protocol (IP) address may transmit or receive network traffic on behalf of the user account and the service account.

A network device (e.g., a network security device, such as a firewall) may be configured to enforce one or more security policies for the client device. While the user account and the service account are both logged in, the network device may store a first authentication entry for the user account and a second authentication entry for the service account. Both authentication entries may include information relating to the client device, such as the IP address.

Because the authentication entries contain the same IP address, the network device may be unable to differentiate between network traffic corresponding to the user account and network traffic corresponding to the service account. For example, the network device may be unable to identify whether network traffic received from or destined for the IP address of the client device is associated with the user account or the service account. As a result, any session established by one of the user account or the service account may be effectively linked to both accounts.

After the user account or the service account logs off, the network device may receive an indication from the IP address of the client device that the user account or the service account has logged off, and the network device may delete the authentication entry corresponding to the user account or the service account that logged off. In some examples, before deleting the authentication entry, the network device may identify whether any other sessions are linked to the authentication entry.

Because a session is linked to both the user account and the service account, the network device may refrain from deleting the session. For example, instead of deleting the session, the network device may decrement a reference count associated with the session. For example, the network device may decrement the reference count to 1 because one of the user account or the service account remains logged in. Thus, the session may persist until both accounts have logged off and the reference count is 0. For example, if the user account has logged off and the service account remains logged in, the network device may allow a user session to persist even though the user has logged out. Allowing a session to persist until all associated accounts have logged out may consume excessive memory resources, computing resources, or the like.

Additionally, or alternatively, the client device may use a web browser to originate network traffic, and a secure access service edge (SASE) may redirect the network traffic to an authentication service (e.g., a microservice in the cloud) that authenticates the network traffic and generates a cookie indicating that the network traffic has been authenticated. The SASE may transmit the cookie to the network device, which may install the cookie as an authentication entry and allow the network traffic.

To set the cookie in the browser, the SASE may perform a cross-domain redirect, which may involve sending redirect messages and/or redirecting the network traffic across domains. Cross-domain redirects may not be secure; for example, cross-domain network traffic, and/or other types of network traffic (e.g., preflight network traffic, cross-origin resource sharing (CORS) network traffic, or the like), may bypass verification at the network device. Moreover, certain web browsers may be incompatible with such mechanisms due to browser-based dependencies. Furthermore, cross-domain redirects may lead to poor user experience (e.g., due to increased latency or the like).

Some implementations described herein enable the network device to obtain a client certificate from the client device. In some examples, the network device may be configured as an SSLFP. An SSLFP may split a secure session between the client device and a server device into two parts and act as a man-in-the-middle (e.g., between the client device and the server device). In some examples, the network device may retrieve the client certificate from the client device using MTLS. MTLS may enable the network device to perform mutual authentication of the client device and the server device by validating the client certificate from the client device and a server certificate from the server device.

As a result, the network device may use the client certificate to differentiate network traffic and/or avoid cross-domain redirects. In some examples, the network device may use information (e.g., a user name) in the client certificate to identify which account the network traffic is associated with. Therefore, the network device may end a session and thereby reduce usage of resources, such as memory resources, computing resources, or the like. In some examples, the network device may authenticate the user using the client certificate instead of the cookie-based approach, thereby improving network traffic security, browser-based dependencies, user experience, or the like.

FIG. 1 is a diagram of an example implementation 100 associated with MTLS for an SSLFP. As shown in FIG. 1, example implementation 100 includes a client device 105, a network device 110, a server device 115, and an identity manager 120. The network device 110 may be a security device, such as a firewall device. In some examples, the network device 110 may be configured as an SSLFP for the client device 105 and the server device 115. The identity manager 120 may be responsible for authentication based on identities. In some examples, the identity manager 120 may comprise a Juniper® identity management services (JIMS) solution. These devices are described in more detail below in connection with FIGS. 3-5.

As shown by reference number 125, the client device 105 may transmit, and the network device 110 may receive, network traffic. For example, the network device 110 (e.g., an SSLFP solution enabled on the network device 110) may intercept network traffic destined for the server device 115. In some examples, the network device 110 may intercept the network traffic for inspection. In some examples, the network device 110 may intercept the network traffic whenever the network traffic arrives at the network device 110. In some aspects, the network traffic may be hypertext transfer protocol secure (HTTPS) traffic. For example, the network traffic may be browser HTTPS traffic. In some examples, the network traffic may be SSL traffic (e.g., non-HTTPS traffic).

In some aspects, the network traffic may be associated with an identity. The network traffic may be associated with the identity in that the identity may trigger the client device 105 to transmit the network traffic. In some aspects, the identity may be associated with a user. The identity may be associated with the user in that the identity may be a user account that is accessible by the user. In some examples (e.g., where the identity is associated with the user), the network traffic may be user traffic. In some aspects, the identity may be associated with a service. The identity may be associated with the service in that the identity may be a service account that corresponds to the service. In some examples (e.g., where the identity is associated with the service), the network traffic may be service traffic. In some examples, user accounts and/or service accounts may be handled by an active directory.

As shown by reference number 130, the network device 110 may transmit, and the client device 105 may receive, using MTLS, a request for a client certificate associated with the identity. For instance, the example implementation 100 may support MTLS (e.g., user-based and/or service-based MTLS support), and the network device 110 may issue a certificate request to the client device 105, such as a request to present the client certificate. The client certificate may be associated with the identity in that the client certificate may be installed on the identity (e.g., the user account or the service account). For example, the client certificate may be installed on the identity manually.

As shown by reference number 135, the client device 105 may transmit, and the network device 110 may receive, responsive to the request, the client certificate. In some examples, the client certificate may indicate certificate details, such as a user name associated with a user (e.g., in examples where the identity is a user account), a public key, or the like. For example, the network device 110 may obtain the user name from a common name (CN) field of the client certificate.

In some aspects, the network device 110 may authenticate the identity based on the client certificate. For example, after the client device 105 has presented the client certificate to the network device 110, the network device 110 may verify the client certificate. For example, the network device 110 may authenticate the identity using the certificate details, such as the public key.

As shown by reference number 140, the network device 110 may transmit, and the identity manager 120 may receive, based on the client certificate, a request to create a session associated with the identity. The session may be associated with the identity in that the session may be linked to the identity (e.g., and not to other identities). In some examples, after obtaining the user name from the CN field of the client certificate, the network device 110 may issue the request to the identity manager 120. For example, the request may be a push-to-identity-management request. In some examples, the identity manager 120 (e.g., an identity management server of the identity manager 120) may create a session and prepare identity-specific authentication entry information. The session created on the identity manager 120 may help to synchronize the authentication entry with the network device 110 via one or more intermediate components of the identity manager 120 (e.g., an identity manger client, an identity manager server, or the like).

In some aspects (e.g., where identity is associated with the user), the identity-specific authentication entry information may comprise one or more of the user name or a role associated with the user. The role may be associated with the user in that the user may belong to a group corresponding to the role. In some examples, the role may be a position or title of the user within a company.

As shown by reference number 145, the identity manager 120 may transmit, and the network device 110 may receive, identity-specific authentication entry information. For example, the network device 110 may fetch the identity-specific authentication entry information. In some examples, the network device 110 may create an authentication entry (e.g., an identity-specific authentication entry) using the identity-specific authentication entry information. For example, the authentication entry may contain the identity-specific authentication entry information, such as the user name, the role, or the like. The authentication entry may indicate that the user or service has been authenticated. In some examples, the network device 110 may create a session associated with the authentication entry. The session may be for ongoing network traffic, and may be based on endpoint IP address and/or port tuple information.

As shown by reference number 150, the network device 110 may selectively transmit, and the server device 115 may receive, further network traffic based on the identity-specific authentication entry information. For example, the network device 110 may allow or deny the further network traffic using one or more firewall policies corresponding to the identity based on the user name, the role, or the like. For example, the network device 110 may grant access to the server device 115 based on verifying the client certificate.

As shown by reference number 155, the network device 110 may delete, based on the client certificate, the session associated with the identity. For example, the network device 110 may delete the session (e.g., close an ongoing traffic session) in cases where multiple identities are logged in. In some examples, the network device 110 may delete the session based on the session being associated with the authentication entry. For example, the network device 110 may delete the session responsive to the authentication entry being deleted and/or timed out.

In some aspects (e.g., where the identity is associated with the user), the network device 110 may delete the session responsive to a logoff event associated with the identity. The logoff event may be associated with the identity in that the identity (e.g., the user account or the service account) may trigger the logoff event. In some examples, a corresponding session may be closed whenever a user or a service logs out. For example user accounts may prompt logouts frequently, and the network device 110 may delete each corresponding session accordingly.

In some aspects (e.g., where the identity is associated with the user), the network device 110 may delete the session based on the user name indicated by the client certificate. For example, the network device 110 may tie the user traffic to the authentication entry using the user name, thereby enabling the user traffic to be distinguished from other traffic, such as service traffic, user traffic not associated with the authentication entry, or the like.

Deleting the session associated with the identity based on the client certificate may reduce usage of resources, such as memory resources, computing resources, or the like. For example, the network device 110 may distinguish between network traffic associated with different identities to delete the session. The network device 110 may delete the session in environments where multiple users share an IP address, such as virtual desktop environments (e.g., environments implementing a virtual desktop infrastructure), environments where network address translation causes user traffic from multiple client devices to have the same public IP address, or the like.

Receiving identity-specific authentication entry information based on the client certificate may improve network traffic security, web browser compatibility, user experience, or the like. For example, the network device 110 may perform MTLS-based authentication (e.g., MTLS-based user authentication), thereby avoiding authentication based on cookies (e.g., domain-specific cookies, global cookies, or the like). As a result, MTLS-based support may help to mitigate or eliminate issues involving CORS or preflight traffic, browser-based dependencies, or the like. Moreover, techniques described herein may apply to non-endpoint-based solutions or to endpoint-based solutions.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
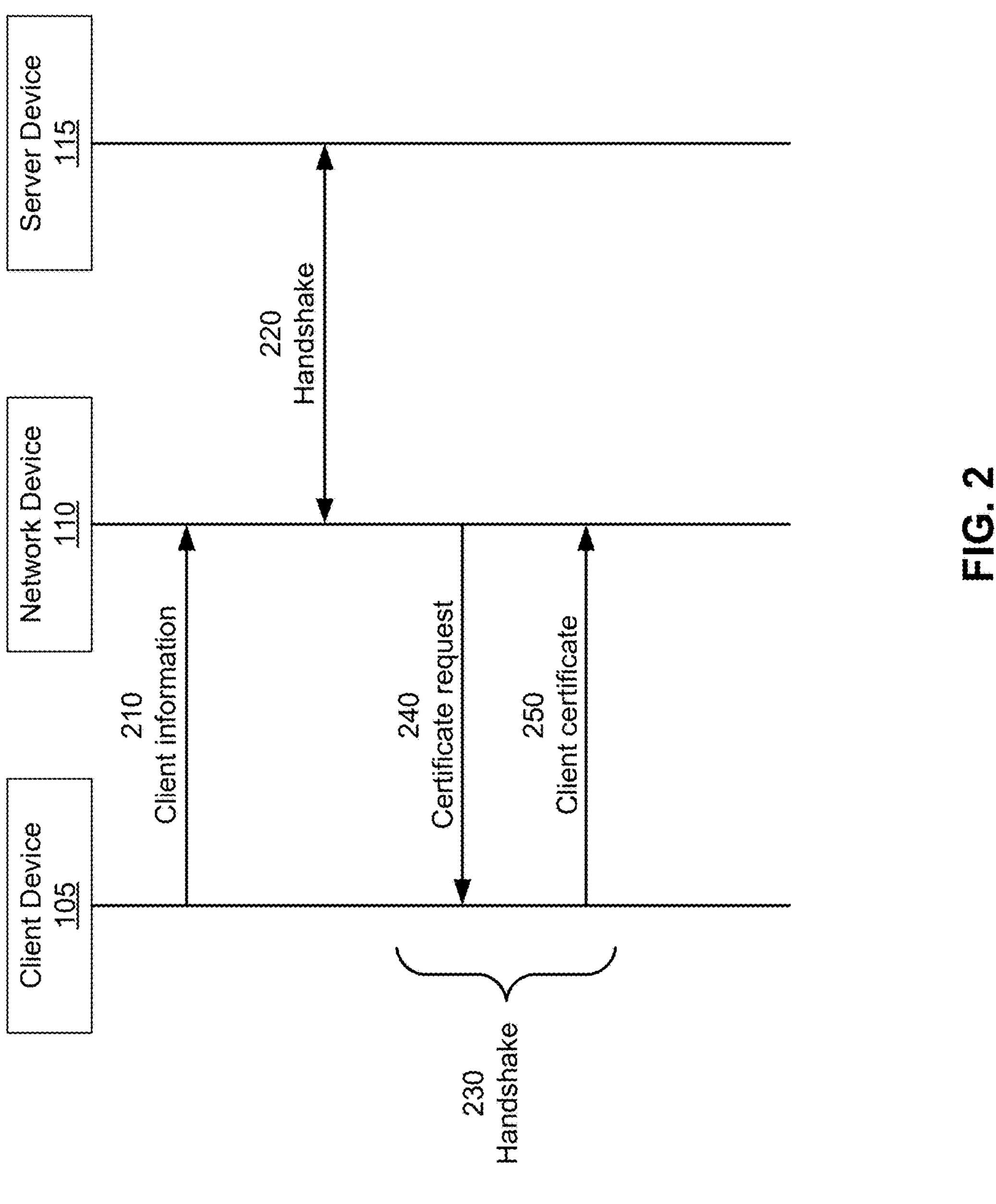
FIG. 2 is a diagram of an example associated with an MTLS handshake involving an SSLFP.

FIG. 2 is a diagram of an example 200 associated with an MTLS handshake involving an SSLFP. As shown in FIG. 2, the client device 105 and the server device 115 may communicate with each other via the network device 110, which may be configured as an SSLFP for the client device 105 and the server device 115.

As shown by reference number 210, the client device 105 may transmit, and the network device 110 may receive, client information (e.g., information associated with the client device 105). As shown by reference number 220, the network device 110 and the server device 115 may perform a handshake (e.g., by exchanging one or more messages). As shown by reference number 230, the network device 110 and the client device 105 may perform a handshake (e.g., by exchanging one or more messages). As shown by reference number 240, as part of the handshake, the network device 110 may transmit, and the client device 105 may receive, a certificate request (e.g., a request for a client certificate associated with an identity). As shown by reference number 250, as part of the handshake, the client device 105 may transmit, and the network device 110 may receive, the client certificate.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
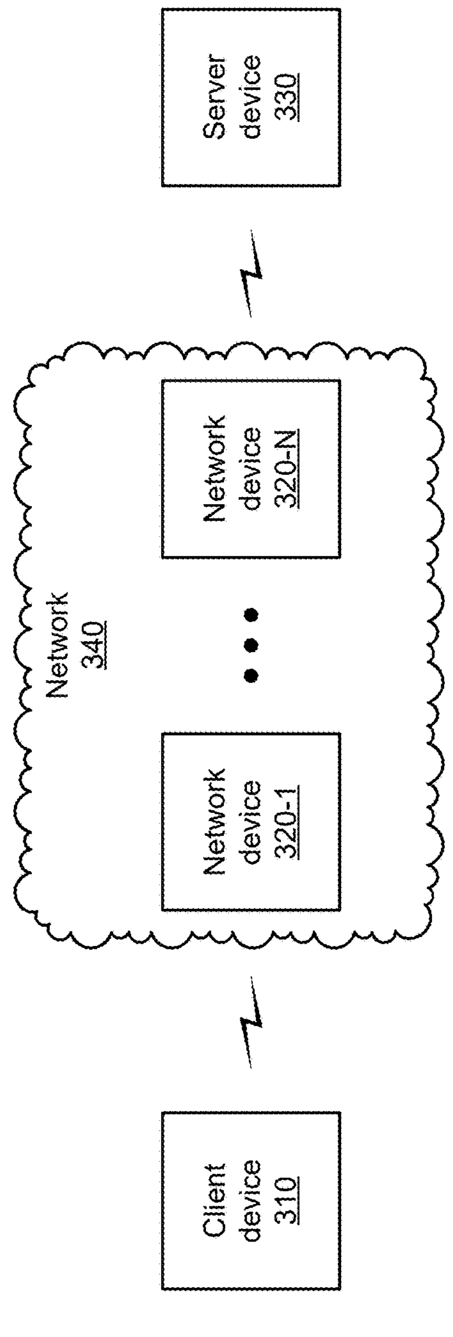
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client device 310, a group of network devices 320 (shown as network device 320-1 through network device 320-N), a server device 330, and a network 340. Devices of environment 300 may interconnect via wired connections, wireless connections, or a combination of wired and wireless connections.

Client device 310 includes one or more devices capable of receiving, generating, storing, processing, and/or providing information, such as information described herein. For example, client device 310 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, client device 310 may receive network traffic from and/or may provide network traffic to other client devices 310 and/or server device 330, via network 340 (e.g., by routing packets using network devices 320 as intermediaries).

Network device 320 includes one or more devices capable of receiving, processing, storing, routing, and/or providing traffic (e.g., a packet or other information or metadata) in a manner described herein. For example, network device 320 may include a router, such as a label switching router (LSR), a label edge router (LER), an ingress router, an egress router, a provider router (e.g., a provider edge router or a provider core router), a virtual router, or another type of router. Additionally, or alternatively, network device 320 may include a gateway, a switch, a firewall, a hub, a bridge, a reverse proxy, a server (e.g., a proxy server, a cloud server, or a data center server), a load balancer, and/or a similar device. In some implementations, network device 320 may be a physical device implemented within a housing, such as a chassis. In some implementations, network device 320 may be a virtual device implemented by one or more computer devices of a cloud computing environment or a data center. In some implementations, a group of network devices 320 may be a group of data center nodes that are used to route traffic flow through network 340.

Server device 330 includes one or more devices capable of receiving, generating, storing, processing, and/or providing information, such as information described herein. For example, server device 330 may include a laptop computer, a tablet computer, a desktop computer, a group of server devices, or a similar type of device, associated with multicast traffic. In some implementations, server device 330 may receive information from and/or transmit information (e.g., multicast traffic) to client device 310, via network 340 (e.g., by routing packets using network devices 320 as intermediaries).

Network 340 includes one or more wired and/or wireless networks. For example, network 340 may include a packet switched network, a cellular network (e.g., a fifth generation (5G) network, a fourth generation (4G) network, such as a long-term evolution (LTE) network, a third generation (3G) network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
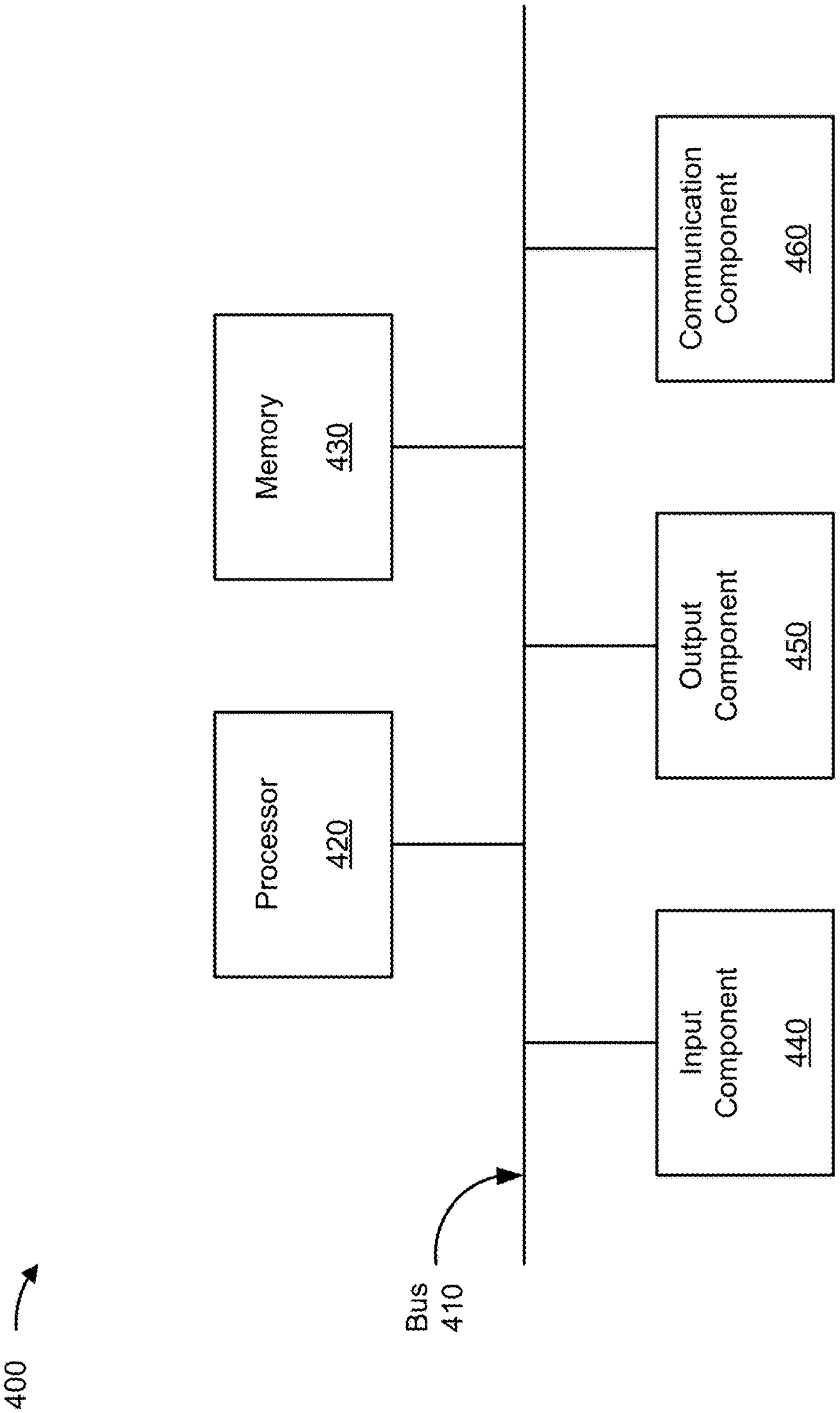
FIG. 4 is a diagram of example components of a device associated with MTLS for SSLFPs.

FIG. 4 is a diagram of example components of a device 400 associated with MTLS for SSLFPs. The device 400 may correspond to client device 310, network device 320, and/or server device 330. In some implementations, client device 310, network device 320, and/or server device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
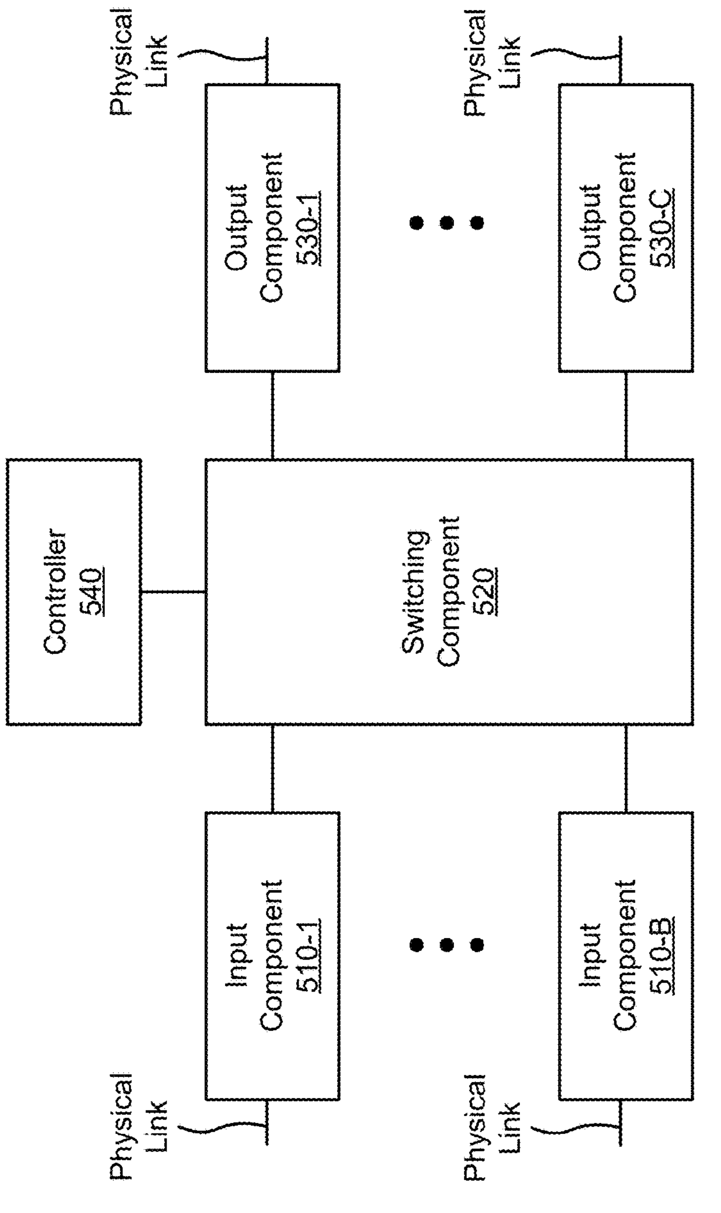
FIG. 5 is a diagram of example components of a device associated with MTLS for SSLFPs.

FIG. 5 is a diagram of example components of a device 500 associated with MTLS for SSLFPs. Device 500 may correspond to network device 320. In some implementations, network device 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
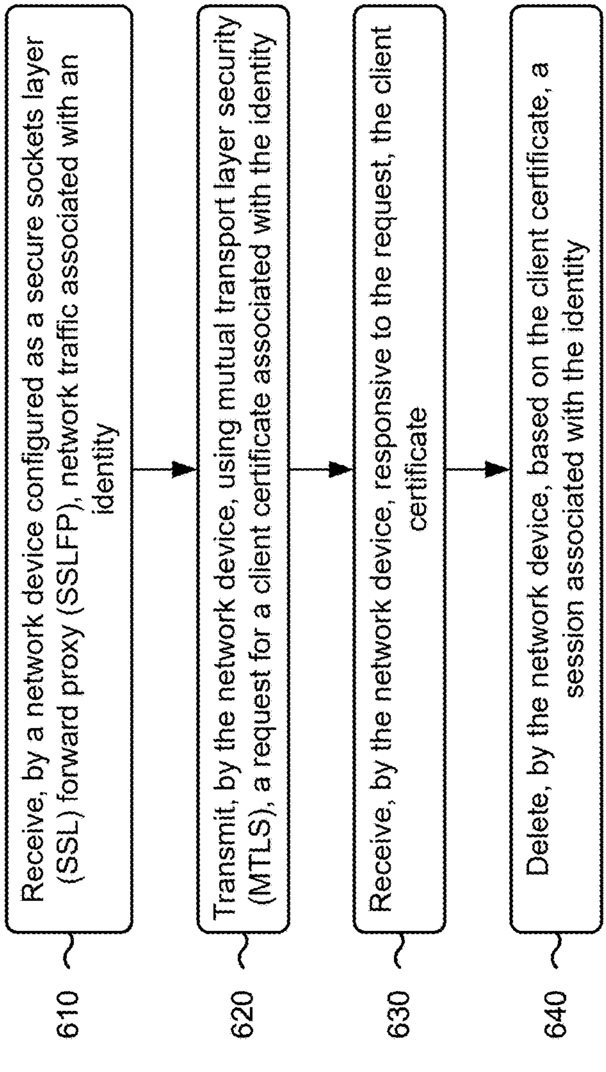
FIG. 6 is a flowchart of an example process associated with MTLS for SSLFPs.

FIG. 6 is a flowchart of an example process 600 associated with MTLS for SSLFPs. In some implementations, one or more process blocks of FIG. 6 are performed by a network device (e.g., network device 110). In some implementations, one or more process blocks of FIG. 6 are performed by another device or a group of devices separate from or including the network device, such as a client device (e.g., client device 310), a network device (e.g., network device 320), and/or a server device (e.g., server device 330). Additionally, or alternatively, one or more process blocks of FIG. 6 may be performed by one or more components of device 400, such as processor 420, memory 430, input component 440, output component 450, and/or communication component 460, and/or one or more process blocks of FIG. 6 may be performed by one or more components of device 500, such as input component 510, switching component 520, output component 530, and/or controller 540.

As shown in FIG. 6, process 600 may include receiving network traffic associated with an identity (block 610). For example, the network device may receive network traffic associated with an identity, as described above.

As further shown in FIG. 6, process 600 may include transmitting, using MTLS, a request for a client certificate associated with the identity (block 620). For example, the network device may transmit, using MTLS, a request for a client certificate associated with the identity, as described above.

As further shown in FIG. 6, process 600 may include receiving, responsive to the request, the client certificate (block 630). For example, the network device may receive, responsive to the request, the client certificate, as described above.

As further shown in FIG. 6, process 600 may include deleting, based on the client certificate, a session associated with the identity (block 640). For example, the network device may delete, based on the client certificate, a session associated with the identity, as described above.

Process 600 may include additional implementations, such as any single implementation or any combination of implementations described below and/or in connection with one or more other processes described elsewhere herein.

In a first implementation, process 600 includes receiving, by the network device, based on the client certificate, identity-specific authentication entry information.

In a second implementation, alone or in combination with the first implementation, deleting the session includes deleting the session responsive to a logoff event associated with the identity.

In a third implementation, alone or in combination with one or more of the first and second implementations, the identity is associated with a user.

In a fourth implementation, alone or in combination with one or more of the first through third implementations, deleting the session includes deleting the session based on a user name indicated by the client certificate.

In a fifth implementation, alone or in combination with one or more of the first through fourth implementations, the identity is associated with a service.

In a sixth implementation, alone or in combination with one or more of the first through fifth implementations, the network traffic is HTTPS traffic.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a network device configured as a secure sockets layer (SSL) forward proxy (SSLFP), network traffic associated with an identity, wherein the identity is associated with a user account and a service account;

transmitting, by the network device, using mutual transport layer security (MTLS), a request for a client certificate associated with the identity;

receiving, by the network device, the client certificate in response to the request; and deleting, by the network device, a session associated with the user account and the service account, based on the client certificate, and in response to a logoff event associated with the user account while the service account is logged in.

2. The method of claim 1, further comprising: receiving, by the network device, based on the client certificate, identity-specific authentication entry information.

3. The method of claim 1, wherein deleting the session includes deleting the session based on a user name indicated by the client certificate.

4. The method of claim 1, wherein the network traffic is hypertext transfer protocol secure (HTTPS) traffic.

5. A device configured as a secure sockets layer (SSL) forward proxy (SSLFP), comprising:

one or more memories; and one or more processors to:

receive network traffic associated with an identity, wherein the identity is associated with a user account and a service account;

transmit, using mutual transport layer security (MTLS), a request for a client certificate associated with the identity;

receive, responsive to the request, the client certificate;

receive, based on the client certificate, identity-specific authentication entry information;

selectively transmit further network traffic based on the identity-specific authentication entry information; and delete, based on the client certificate and in response to a logoff event associated with the user account while the service account is logged in, a session associated with the user account and the service account.

6. The device of claim 5, wherein the one or more processors are further to:

authenticate the identity based on the client certificate.

7. The device of claim 5, wherein the identity-specific authentication entry information comprises one or more of a user name associated with a user or a role associated with the user.

8. The device of claim 5, wherein the one or more processors are further to:

transmit, based on the client certificate, a request to create a session associated with the identity.

9. The device of claim 5, wherein the network traffic is hypertext transfer protocol secure (HTTPS) traffic.

10. A non-transitory computer-readable medium storing a set of instructions, the set of instructions comprising:

one or more instructions that, when executed by one or more processors of a device configured as a secure sockets layer (SSL) forward proxy (SSLFP), cause the device to:

receive network traffic associated with an identity, wherein the identity is associated with a user account and a service account;

transmit, using mutual transport layer security (MTLS), a request for a client certificate associated with the identity;

receive, responsive to the request, the client certificate;

receive, based on the client certificate, identity-specific authentication entry information;

selectively transmit further network traffic based on the identity-specific authentication entry information; and delete, based on the client certificate and in response to a logoff event associated with the user account while the service account is logged in, a session associated with the user account and the service account.

11. The non-transitory computer-readable medium of claim 10, wherein the one or more instructions, when executed by the one or more processors, further cause the device to:

transmit, based on the client certificate, a request to create a session associated with the identity.

12. The non-transitory computer-readable medium of claim 10, wherein the network traffic is hypertext transfer protocol secure (HTTPS) traffic.

13. The non-transitory computer-readable medium of claim 10, wherein the identity-specific authentication entry information comprises one or more of a user name associated with a user or a role associated with the user.

14. The non-transitory computer-readable medium of claim 13, wherein a common name field of the client certificate indicates the user name associated with the user.

15. The method of claim 2, wherein the identity-specific authentication entry information comprises one or more of a user name associated with a user or a role associated with the user.

16. The method of claim 15, wherein a common name field of the client certificate indicates the user name associated with the user.

17. The device of claim 7, wherein a common name field of the client certificate indicates the user name associated with the user.

18. The method of claim 1, wherein the client certificate indicates a public key associated with the identity.

19. The device of claim 7, wherein the client certificate indicates a public key associated with the identity.

20. The non-transitory computer-readable medium of claim 13, wherein the client certificate indicates a public key associated with the identity.

* * * * *